(12) United States Patent
Shu

(10) Patent No.: US 10,272,589 B1
(45) Date of Patent: Apr. 30, 2019

(54) MAILBOX PUNCHING DEVICE

(71) Applicant: Yongjun Shu, Hangzhou (CN)

(72) Inventor: Yongjun Shu, Hangzhou (CN)

(73) Assignee: Pujiang Qilu Environmental Protection Technology Co., Ltd., Jinhua, Zhejiang Province (CN)

( * ) Notice: Subject to any disclaimer, the term of this patent is extended or adjusted under 35 U.S.C. 154(b) by 0 days.

(21) Appl. No.: 16/056,565

(22) Filed: Aug. 7, 2018

(30) Foreign Application Priority Data

Mar. 22, 2018 (CN) .......................... 2018 1 02383514

(51) Int. Cl.
*B23Q 1/00* (2006.01)
*B26F 1/16* (2006.01)
*B23B 39/04* (2006.01)
*B23B 39/14* (2006.01)

(52) U.S. Cl.
CPC ............. *B26F 1/16* (2013.01); *B23B 39/04* (2013.01); *B23B 39/14* (2013.01); *B23Q 1/0054* (2013.01); *Y10T 408/65* (2015.01); *Y10T 408/6793* (2015.01); *Y10T 408/91* (2015.01)

(58) Field of Classification Search
CPC ........... B26F 1/16; B23B 39/04; B23B 39/14; B23Q 1/0054; Y10T 408/65; Y10T 408/6793; Y10T 408/91
See application file for complete search history.

(56) References Cited

U.S. PATENT DOCUMENTS

| 18,977 | A | * | 12/1857 | Kittinger | B27F 5/10 144/79 |
| 590,721 | A | * | 9/1897 | Fanning | B23G 1/16 408/137 |
| 676,043 | A | * | 6/1901 | Lincoln | B25H 1/0071 408/137 |
| 2,254,032 | A | * | 8/1941 | Fisher | B23G 1/18 408/137 |

(Continued)

FOREIGN PATENT DOCUMENTS

| CN | 2291238 | 9/1998 |
| CN | 201350515 | 11/2009 |

(Continued)

OTHER PUBLICATIONS

First Office Action for Chinese Counterpart Application 2018102383514 dated Jul. 17, 2018.

*Primary Examiner* — Eric A Gates

(57) ABSTRACT

The invention discloses a mailbox punching device, comprising a baseplate, two frames which are correspondingly arranged at two ends of the top of the baseplate, and a box arranged between the two frames on the two ends through a lifting device. The inner bottom of the box is provided with a first steering cavity with an opening facing downward, and a second steering cavity extends vertically in the box above the first steering cavity. A first sliding groove is connectedly set on one inner wall of the second steering cavity, and a steering platform, through bearings, is rotatably mounted in the first steering cavity. A first steering shaft, which extends into the second steering cavity, is fixedly arranged on the top of the steering platform, and a first bevel gear is fixedly mounted on the first steering shaft in the second steering cavity.

6 Claims, 2 Drawing Sheets

(56) References Cited

U.S. PATENT DOCUMENTS

| | | | | |
|---|---|---|---|---|
| 2,324,922 A | * | 7/1943 | Graves | B23G 1/16 408/137 |
| 2,393,696 A | * | 1/1946 | Kraut | B23B 39/02 29/26 R |
| 2,669,135 A | * | 2/1954 | Moore | B23Q 1/267 408/128 |
| 2,795,149 A | * | 6/1957 | Morris | F16H 25/2233 408/137 |
| 3,344,713 A | * | 10/1967 | Zankl | B23Q 5/40 408/234 |
| 3,512,434 A | * | 5/1970 | Juhasz | B23Q 5/326 408/132 |
| 4,306,464 A | * | 12/1981 | Mosher | B23Q 35/108 33/18.2 |
| 4,597,182 A | | 7/1986 | Rinn | |
| 4,664,566 A | | 5/1987 | Peddinghaus | |
| 4,958,967 A | * | 9/1990 | Adachi | B23Q 1/70 408/129 |
| 5,984,594 A | * | 11/1999 | Osborne | B23B 47/28 408/1 R |
| 6,843,624 B2 | * | 1/2005 | Sugata | B23Q 1/015 408/234 |
| 8,297,892 B2 | * | 10/2012 | Alvarez Serrano | B23Q 39/029 408/234 |

FOREIGN PATENT DOCUMENTS

| | | | | |
|---|---|---|---|---|
| CN | 202174263 | | 3/2012 | |
| CN | 205888123 | | 1/2017 | |
| CN | 107262942 | | 10/2017 | |
| CN | 107486738 | | 12/2017 | |
| GB | 1219605 | | 1/1971 | |
| GB | 1364740 A | * | 8/1974 | B23B 39/04 |

\* cited by examiner

MAILBOX PUNCHING DEVICE

CROSS-REFERENCES TO RELATED APPLICATIONS

The present application claims priority from Chinese application No. 201810238351.4 filed on 2018 Mar. 22 which is hereby incorporated herein by reference in its entirety.

TECHNICAL FIELD

The invention relates to the field of mailbox, in particular to a mailbox punching device.

BACKGROUND OF THE INVENTION

A mailbox is an important storage tool for mail delivery and it is widely used in real life. During manufacturing process of the mailbox, mailbox plates are needed to be punched to facilitate the quick assembly between the various parts of mailbox plates. In the traditional case, the mailbox punching device only has a simple drilling function, and the adjustment and control towards hole distance relies on excessive manpower, which greatly reduces work efficiency and the quality of punching.

BRIEF SUMMARY OF THE INVENTION

The aim of the invention is to provide a mailbox punching device so as to overcome the problems existing in the prior art.

According to the present invention, a mailbox punching device comprises a baseplate, frames which are correspondingly arranged at the two ends of the top of said baseplate, and a box arranged between said two frames on the two ends through a lifting device, wherein the two end faces of said baseplate are simultaneously provided with a fixing block, and said fixing block is provided with a fixing hole, and the inner bottom of said box is provided with a first steering cavity with the opening facing downward. A second steering cavity is up and down extended in said box above said first steering cavity. A first sliding groove is connectedly set on the one inner wall of the second steering cavity, and a steering platform, through bearings, is rotatably mounted in said first steering cavity. A first steering shaft which extends into said second steering cavity, is fixedly arranged on the top of said steering platform, and a first cone pulley is fixedly mounted on said first steering shaft in said second steering cavity. Said first sliding groove is provided with a first sliding block that can be up and down slidably connected. Said first sliding block is provided with a first screw hole, and a first screw bolt is cooperatively mounted in said first screw hole. The bottom of said first screw bolt is rotatably set in the inner bottom wall of said first sliding groove, and the top of said first screw bolt is in power connection with a first motor which is fixedly set in the inner top wall of said first sliding groove. A second motor, one side of which is in power connection with a second steering shaft extending to said second steering cavity, is set in one end face of said first sliding block. Said second steering shaft in said second steering cavity is fixedly provided with a second cone pulley cooperatively connected to said first cone pulley, and said box above said second steering cavity is provided with a third steering cavity which is rotatably provided with a toothed connecting gear through the third steering shaft. A third cone pulley, which is cooperatively connected with said toothed connecting gear, is rotatably mounted on the inner bottom wall of said third steering cavity, and a third steering shaft extending into said second steering cavity is fixedly set at the bottom end face of said third cone pulley. Said third steering shaft in said second steering cavity is fixedly provided with a fourth cone pulley matched with said second cone pulley, wherein the inner top wall of said third steering cavity is provided with a sliding cavity which extends to two sides and passes through the two sides of said box, and a sliding arm is slidably mounted on said sliding cavity. The top end face of said sliding arm is fixedly provided with a toothed connecting strip which is cooperatively connected with said toothed connecting gear.

In a further technical proposal, said lifting device comprises second sliding grooves which are correspondingly set in the inner end face of two said frames on the two sides, and second sliding blocks are slidably mounted in said second sliding grooves. A second screw hole is set in one of said second sliding blocks, and a third screw bolt is cooperatively mounted in said second screw hole. The top of said third screw bolt is rotatably set in the inner top wall of said second sliding groove, and the bottom of said third screw bolt is in power connection with a third motor fixedly set in the inner bottom wall of said second sliding groove. The bottom end face of said second sliding block on the other side is provided with a spring fixedly connected to the inner bottom wall of said second sliding groove on the other side.

In a further technical proposal, two ends of said sliding arm are respectively and fixedly connected to the inner side face of two said second sliding blocks on two sides.

In a further technical proposal, a clamping block is correspondingly arranged at the bottom of the inner side face of two said frames on the two sides.

In a further technical proposal, a mounting platform is fixedly set at the bottom end face of said steering platform, and a drill shaft is fixedly mounted at the bottom of said mounting platform.

In a further technical proposal, said first steering shaft is rotatably connected with the top wall of said first steering cavity and the bottom wall of said second steering cavity, and said third steering shaft is rotatably connected with the top wall of said second steering cavity and the bottom wall of said third steering cavity.

The benefits of the invention are as follows: The invention has simple structure and it is convenient to use. The first steering cavity with the opening facing downward is set at the bottom of the box. The second steering cavity is up and down extended in the box above the first steering cavity. The first sliding groove is connectedly set on the one inner wall of the second steering cavity, and the steering platform, through bearings, is rotatably mounted in the first steering cavity. The first steering shaft which extends into the second steering cavity, is fixedly arranged on the top of said steering platform, and the first cone pulley is fixedly mounted on the first steering shaft in the second steering cavity. The first sliding groove is provided with the first sliding block that can be up and down slidably connected. The first sliding block is provided with the first screw hole, and the first screw bolt is cooperatively mounted in the first screw hole. The bottom of the first screw bolt is rotatably set in the inner bottom wall of the first sliding groove, and the top of the first screw bolt is in power connection with the first motor which is fixedly set in the inner top wall of the first sliding groove. The second motor, one side of which is in power connection with the second steering shaft extending to the second steering cavity, is set in one end face of the first sliding block. The second steering shaft in the second steering cavity is fixedly provided with the second cone pulley cooperatively connected to the first cone pulley, and the box above the second steering cavity is provided with the third steering cavity which is rotatably provided with the toothed connecting gear through the third steering shaft. The third cone pulley, which is cooperatively connected with the toothed connecting gear, is rotatably mounted on the inner bottom wall of the third steering cavity, and the third steering shaft extending into the second steering cavity is fixedly set at the bottom end face of the third cone pulley. The third steering shaft in the second steering cavity is fixedly provided with the fourth cone pulley matched with the second cone pulley, wherein the inner top wall of said third steering cavity is provided with a sliding cavity which extends to two sides and passes through the two sides of said box, and the sliding arm is slidably mounted on the sliding cavity. The top end face of the sliding arm is fixedly provided with the toothed connecting strip which is cooperatively connected with the toothed connecting gear, so as to punch quickly and to adjust hole distance, which can greatly improve the punching efficiency and the punching quality.

BRIEF DESCRIPTIONS OF THE DRAWINGS

For better explain the technical proposal in the present invention embodiments or the prior art, the drawings to be used in the description of the embodiments or the prior art will be briefly described below. Obviously, the drawings in the following description are only some embodiments of the present invention. For those common technicians in the art, other drawings may also be obtained based on these drawings without any creative work.

DETAILED DESCRIPTION OF THE INVENTION

All of the features disclosed in this specification, or all of the methods or procedures in the process disclosed, may be combined in any way other than mutually exclusive features and/or steps.

Any feature disclosed in this specification (including any additional claims, abstract and drawings) may be replaced by other equivalent or alternative features with similar purposes, unless otherwise stated. That is, unless otherwise stated, each feature is just one example of a series of equivalent or similar features.

Figure 1:
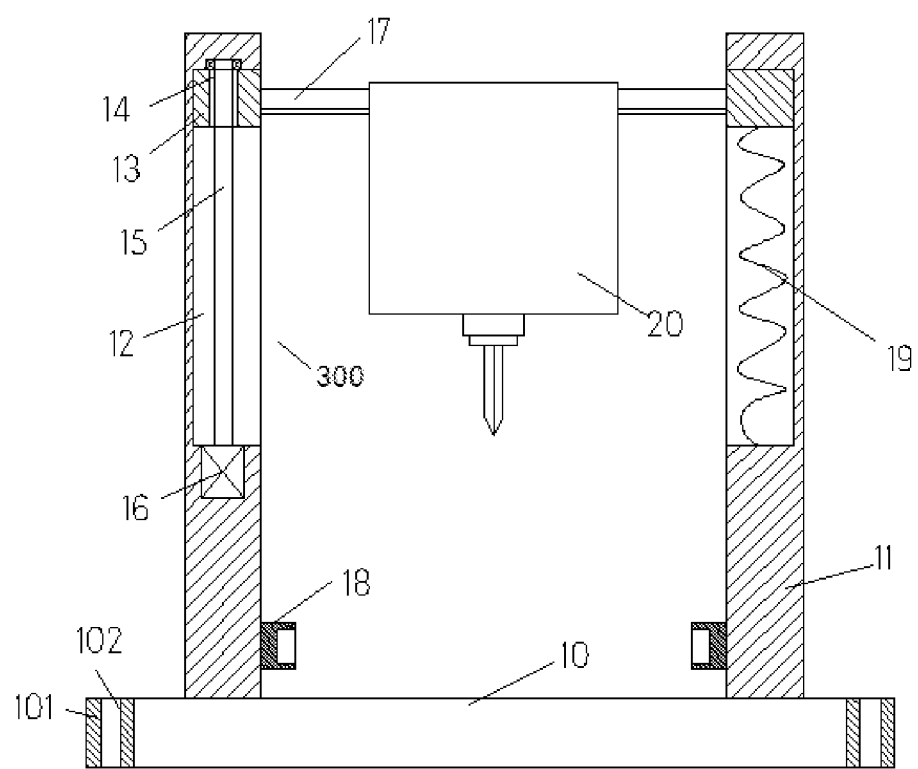
FIG. 1 is the overall structural diagram of a mailbox punching device in this invention.
Figure 2:
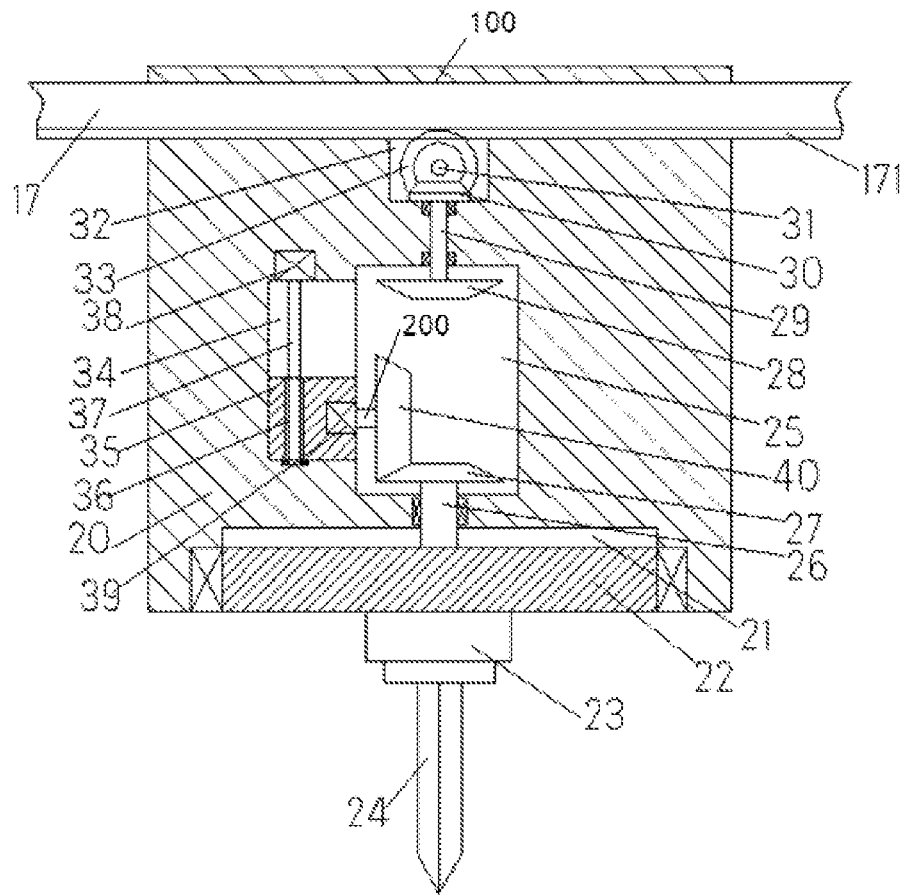
FIG. 2 is the internal structural diagram of the box in this invention.
Figure 3:
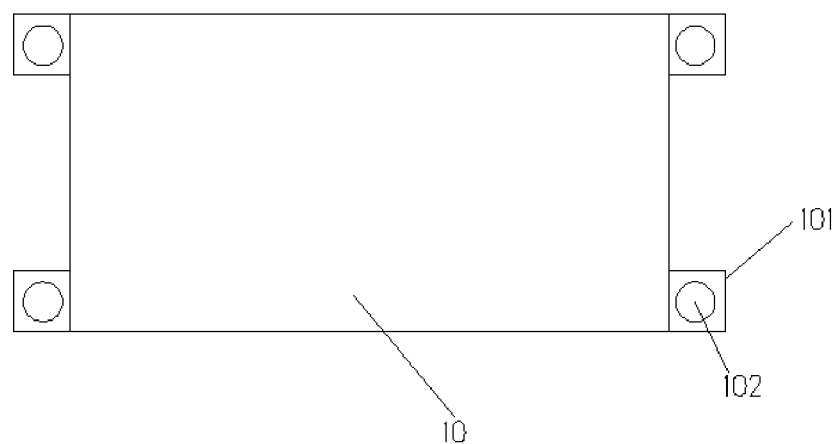
FIG. 3 is the bottom view of the baseplate in this invention.

Referring to FIG. 1-3, a mailbox punching device of the present invention comprises a baseplate 10, frames 11 which are correspondingly arranged at the two ends of the top of said baseplate 10, and a box 20 arranged between two said frames 11 on the two ends through a lifting device 300, wherein the two end faces of said baseplate 10 are simultaneously provided with a fixing block 101, and said fixing block 101 is provided with a fixing hole 102, and said baseplate 10 can be fixed to the bottom face through said fixing block 101. The inner bottom of said box 20 is provided with a first steering cavity 21 with the opening facing downward. A second steering cavity 25 is up and down extended in said box 20 above said first steering cavity 21. A first sliding groove 34 is connectedly set on the one inner wall of the second steering cavity 25, and a steering platform 22, through bearings, is rotatably mounted in said first steering cavity 21. A first steering shaft 26 which extends into said second steering cavity 25, is fixedly arranged on the top of said steering platform 22, and a first bevel gear 27 is fixedly mounted on said first steering shaft 26 in said second steering cavity 25. Said first sliding groove 34 is provided with a first sliding block 35 that can be up and down slidably connected. Said first sliding block 35 is provided with a first screw hole 36, and a first screw bolt 37 is cooperatively mounted in said first screw hole 36. The bottom of said first screw bolt 37 is rotatably set in the inner bottom wall of said first sliding groove 34, and the top of said first screw bolt is in power connection with a first motor 38 which is fixedly set in the inner top wall of said first sliding groove 34. A second motor 39, one side of which is in power connection with a second steering shaft 200 extending to said second steering cavity 25, is set in one end face of said first sliding block 35. Said second steering shaft 200 in said second steering cavity 25 is fixedly provided with a second bevel gear 40 cooperatively connected to said first bevel gear 27, and said box 20 above said second steering cavity 25 is provided with a third steering cavity 32 which is rotatably provided with a toothed connecting gear 33 through the third steering shaft 31. A third bevel gear 30, which is cooperatively connected with said toothed connecting gear 33, is rotatably mounted on the inner bottom wall of said third steering cavity 32, and a third steering shaft 29 extending into said second steering cavity 25 is fixedly set at the bottom end face of said third bevel gear 30. Said third steering shaft 29 in said second steering cavity 25 is fixedly provided with a fourth bevel gear 28 matched with said second bevel gear 40, wherein the inner top wall of said third steering cavity 32 is provided with a sliding cavity 100 which extends to two sides and passes through the two sides of said box 20, and a sliding arm 17 is slidably mounted on said sliding cavity 100. The top end face of said sliding arm 17 is fixedly provided with a toothed connecting strip 171 which is cooperatively connected with said toothed connecting gear 33.

Helpfully, wherein said lifting device 300 comprises second sliding grooves 12 which are correspondingly set in the inner end face of two said frames 11 on the two sides, and second sliding blocks 13 are slidably mounted in said second sliding grooves 12. A second screw hole 14 is set in one of said second sliding blocks 13, and a third screw bolt 15 is cooperatively mounted in said second screw hole 14. The top of said third screw bolt 15 is rotatably set in the inner top wall of said second sliding groove 12, and the bottom of said third screw bolt is in power connection with a third motor 16 fixedly set in the inner bottom wall of said second sliding groove 12. The bottom end face of said second sliding block 13 on the other side is provided with a spring 19 fixedly connected to the inner bottom wall of said second sliding groove 12 on the other side, and said spring 19 is used for improving the stability of said second sliding block 13 on the other side when it slides up and down.

Helpfully, wherein two ends of said sliding arm 17 are respectively fixedly connected to the inner side face of two said second sliding blocks 13 on two sides, so as to drive said box 20 to move up and down.

Helpfully, wherein a clamping block 18 is correspondingly arranged at the bottom of the inner side face of two said frames 11 on the two sides, and said clamping block 18 is used for mounting mailbox plates.

Helpfully, wherein a mounting platform 23 is fixedly set at the bottom end face of said steering platform 22, and a drill shaft 24 is fixedly mounted at the bottom of said mounting platform 23 so as to rotate to punch holes.

Helpfully, wherein said first steering shaft 26 is rotatably connected with the top wall of said first steering cavity 21 and the bottom wall of said second steering cavity 25, and said third steering shaft 29 is rotatably connected with the top wall of said second steering cavity 25 and the bottom wall of said third steering cavity 32.

When the present invention is in the initial state, the bottom end face of said second sliding block 13 is closely connected with the inner top wall of said second sliding groove 12, and the top end face of said first sliding block 35 is closely connected to the inner bottom end of said first sliding groove 34. Said second cone pulley 40 engages with said first cone pulley 27.

When in use, the mailbox plates are fixed between two said frames 11 on the two sides through said clamping block 18, and then said second motor 39 and said third motor 16 are controlled to rotate. After said second motor 39 is rotated, said steering platform 22 and said drill shaft 24 are driven to rotate through the cooperation of said second cone pulley 40 and said first cone pulley 27. After said third motor 16 is rotated, said sliding arm 17 and said box 20 are driven to move downward through the way that said second screw bolt 15 drives said second sliding block 13, so that the mailbox plates can be punched. When the horizontal hole distance needs to be adjusted, said first motor 38 can be controlled to rotate. After said first motor 38 is rotated, said first sliding block 35 can be driven to slide upward through said first screw bolt 37. When said first sliding block 35 slides upward, said second cone pulley 40 gradually disengages from said first cone pulley 27. When said second cone pulley 40 completely disengages from said first cone pulley 27 and engages with said fourth cone pulley 28, said first motor 38 is stopped, and said second motor 39 is controlled to operate. After said second motor 39 is rotated, said driving gear 33 can be driven to rotate by said third cone pulley 30. After said driving gear 33 is rotated, said box 20 can be driven to slide horizontally opposite to said sliding arm 17 by cooperation with said toothed connecting strip 171, so that adjustment of hole distance can be performed.

The benefits of the invention are as follows: The invention has simple structure and it is convenient to use. The first steering cavity with the opening facing downward is set at the bottom of the box. The second steering cavity is up and down extended in the box above the first steering cavity. The first sliding groove is connectedly set on the one inner wall of the second steering cavity, and a steering platform, through bearings, is rotatably mounted in the first steering cavity. The first steering shaft which extends into the second steering cavity, is fixedly arranged on the top of said steering platform, and the first cone pulley is fixedly mounted on the first steering shaft in the second steering cavity. The first sliding groove is provided with the first sliding block that can be up and down slidably connected. The first sliding block is provided with the first screw hole, and the first screw bolt is cooperatively mounted in the first screw hole. The bottom of the first screw bolt is rotatably set in the inner bottom wall of the first sliding groove, and the top of the first screw bolt is in power connection with the first motor which is fixedly set in the inner top wall of the first sliding groove. The second motor, one side of which is in power connection with the second steering shaft extending to the second steering cavity, is set in one end face of the first sliding block. The second steering shaft in the second steering cavity is fixedly provided with the second cone pulley cooperatively connected to the first cone pulley, and the box above the second steering cavity is provided with the third steering cavity which is rotatably provided with the toothed connecting gear through the third steering shaft. The third cone pulley, which is cooperatively connected with the toothed connecting gear, is rotatably mounted on the inner bottom wall of the third steering cavity, and the third steering shaft extending into the second steering cavity is fixedly set at the bottom end face of the third cone pulley. The third steering shaft in the second steering cavity is fixedly provided with the fourth cone pulley matched with the second cone pulley, wherein the inner top wall of said third steering cavity is provided with a sliding cavity which extends to two sides and passes through the two sides of said box, and the sliding arm is slidably mounted on the sliding cavity. The top end face of the sliding arm is fixedly provided with the toothed connecting strip which is cooperatively connected with the toothed connecting gear, so as to punch quickly and to adjust hole distance, which can greatly improve the punching efficiency and the punching quality.

The above is only the specific embodiment of the invention, but the scope of the invention is not limited thereto, and any changes or substitutions without the creative work should be included in the claimed protection extent of this invention. Therefore, the claimed protection extent of the invention shall be determined with reference to the appended claims.

The invention claimed is:

1. A mailbox punching device, comprising: a baseplate; two frames which are correspondingly arranged at two ends of the top of said baseplate; a box arranged between said two frames on the two ends through a lifting device, wherein two end faces of said baseplate are simultaneously provided with a fixing block, and said fixing block is provided with a fixing hole; wherein the inner bottom of said box is provided with a first steering cavity with an opening facing downward, and a second steering cavity extends vertically in said box above said first steering cavity; wherein a first sliding groove is connectedly set on one inner wall of the second steering cavity, and a steering platform, through bearings, is rotatably mounted in said first steering cavity, wherein a first steering shaft, which extends into said second steering cavity, is fixedly arranged on the top of said steering platform, and a first bevel gear is fixedly mounted on said first steering shaft in said second steering cavity; wherein said first sliding groove is provided with a first sliding block that can be up and down slidably connected, which is provided with a first screw hole, and a first screw bolt is cooperatively mounted in said first screw hole, and the bottom of said first screw bolt is rotatably set in the inner bottom wall of said first sliding groove, and the top of said first screw bolt is in power connection with a first motor which is fixedly set in the inner top wall of said first sliding groove; wherein a second motor, one side of which is in power connection with a second steering shaft extending to said second steering cavity, is set in one end face of said first sliding block, and said second steering shaft in said second steering cavity is fixedly provided with a second bevel gear cooperatively connected to said first bevel gear, and said box, above said second steering cavity, is provided with a third steering cavity which is rotatably provided with a toothed connecting gear through a third steering shaft, wherein a third bevel gear, which is cooperatively connected with said toothed connecting gear, is rotatably mounted on the inner bottom wall of said third steering cavity, and said third steering shaft extending into said second steering cavity is fixedly set at the bottom end face of said third bevel gear, wherein said third steering shaft in said second steering cavity is fixedly provided with a fourth bevel gear matched with said second bevel gear, wherein the inner top wall of said third steering cavity is provided with a sliding cavity which extends to and passes through two sides of said box, and a sliding arm is slidably mounted on said sliding cavity, and the top end face of said sliding arm is fixedly provided with a toothed connecting strip which is cooperatively connected with said toothed connecting gear.

2. The mailbox punching device as defined in claim 1, wherein said lifting device comprises second sliding grooves which are correspondingly set in the inner end face of two said frames on the two sides of said box, and second sliding blocks are slidably mounted in said second sliding grooves, wherein a second screw hole is set in one of said second sliding blocks, and a third screw bolt is cooperatively mounted in said second screw hole, wherein the top of said third screw bolt is rotatably set in the inner top wall of said second sliding groove, and the bottom of said third screw bolt is in power connection with a third motor fixedly set in the bottom wall of said second sliding groove, wherein the bottom end face of said second sliding block on the other side is provided with a spring fixedly connected to the inner bottom wall in said second sliding groove on the other side.

3. The mailbox punching device as defined in claim 1, wherein two ends of said sliding arm are respectively fixedly connected to the inner side faces of two said second sliding blocks on the two sides of said box.

4. The mailbox punching device as defined in claim 1, wherein a clamping block is correspondingly arranged at the bottom of the inner side face of two said frames on the two sides of said box.

5. The mailbox punching device as defined in claim 1, wherein a mounting platform is fixedly set at the bottom end face of said steering platform, and a drill shaft is fixedly mounted at the bottom of said mounting platform.

6. The mailbox punching device as defined in claim 1, wherein said first steering shaft is rotatably connected with the top wall of said first steering cavity and the bottom wall of said second steering cavity, and said third steering shaft is rotatably connected with the top wall of said second steering cavity and the bottom wall of said third steering cavity.

* * * * *